Figure 1:
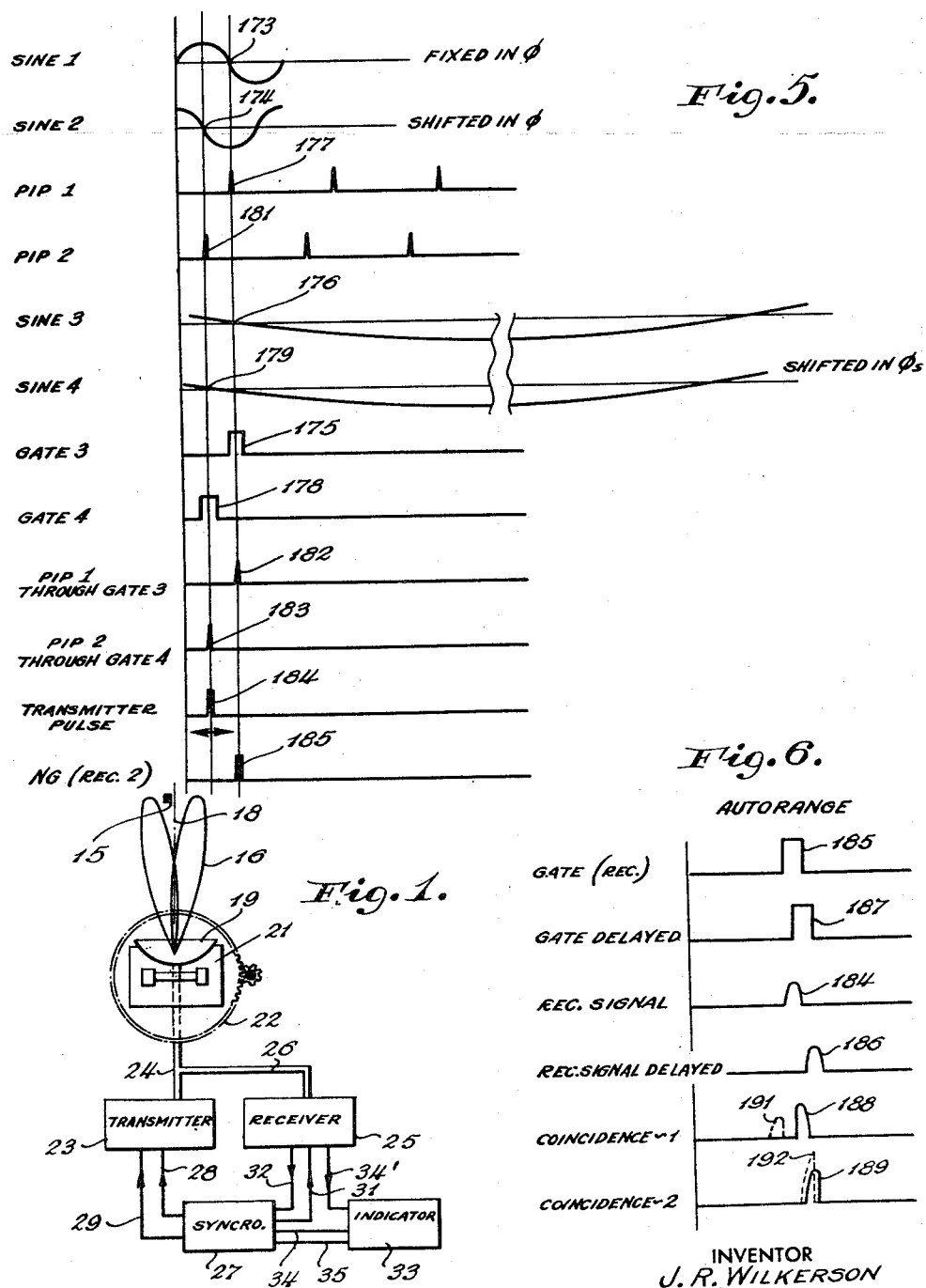

Dec. 19, 1950 J. R. WILKERSON 2,534,329
SYNCHRONIZER CIRCUIT
Filed Oct. 22, 1943 4 Sheets-Sheet 1

INVENTOR
J. R. WILKERSON
BY Paul B. Hunter
ATTORNEY

Patented Dec. 19, 1950

2,534,329

UNITED STATES PATENT OFFICE 2,534,329

SYNCHRONIZER CIRCUIT

Jefferson R. Wilkerson, Bayside, N. Y., assignor to The Sperry Corporation, a corporation of Delaware Application October 22, 1943, Serial No. 507,251

5 Claims. (Cl. 343—7)

My invention relates to electronic circuits generally and is concerned primarily with synchronizing circuits.

In various applications of transmission and reception, such as those made in connection with radio detecting and ranging or "radar" apparatus, it is necessary that the transmission of the detecting or transmitted signal be compared in time with the received or reflected signal, that the receiver be turned on and the transmitter turned off in timed relationship with each other, that the receiver be conditioned to receive selected signals only, that means be provided for accurate measurement of infinitesimal periods of time, and that many other functions be accomplished which must be timed to the micro-second. The circuit which accomplishes these objects is referred to as a synchronizer, and it is with such that the instant invention deals.

Accordingly, it is an object of my invention to provide a synchronizer in which the phase of a transmitted pulse is varied with respect to that of a receiver control pulse or gate.

It is also a purpose of my invention to provide an electronic circuit in which a plurality of frequency dividers are used to decrease the repetition rate of a transmitted pulse which is initiated to occur at intervals corresponding to selected points on a fixed frequency, sinusoidally varying voltage wave.

It is also an object of my invention to provide a synchronizer circuit adaptable to radar apparatus by means of which the system's range sensing apparatus may be automatically operated for range tracking.

As a further object of my invention, I wish to provide a circuit adaptable to radar apparatus which will generate a fixed frequency voltage and a sweep control or gating pulse for the system's indicator circuit, a trigger pulse and a sweep control or gating pulse for its transmitter, and a narrow control or gating pulse for its receiver.

I also wish to provide, as another object of my invention, a synchronizer circuit capable of initiating a transmitted pulse whose time for transmission to and return from a target is determined as a measurement of target range by developing a second voltage having a phase shifted with respect to that of the fixed frequency voltage, and deriving the transmitted pulse therefrom.

As a further object of my invention I wish to provide a circuit in which the repetition rate of a gating voltage pulse may be changed by passing only a predetermined number of the pulses.

A still further object of my invention is to provide, as a part of a synchronizing circuit, a phase shifting device which is capable of shifting the phase of a voltage compared with that of a fixed frequency voltage, one cycle of which is equal to an increment of range, through a plurality of 360° changes without ambiguity.

Other objects and advantages of my invention will become apparent as the description proceeds.

In carrying out my invention, in a preferred embodiment thereof, I provide a circuit in which a fixed frequency voltage is generated whose period, on a basis of the speed of radio wave propagation, is equal to an increment of range measurement. This voltage is delivered both to a phase shifting condenser and to a frequency divider, which in turn supplies a second phase shifter. From the unshifted and shifted voltages, separate short pulses, or "pips," are generated which occur once during each cycle of the fixed frequency voltage. In like manner control or gating voltage pulses, or "gates," are generated from the output voltage of the frequency divider respectively before and after its phase has been shifted. The shifted and unshifted pips are then passed respectively through the shifted and unshifted gates generated from the reduced frequency voltage. The pip whose phase is shifted, after a further reduction in its repetition rate, is supplied as a transmitter trigger pulse. Calibration of the phase shifting condensers of the system provides a measurement of the transit time of the transmitted pulse, and voltages are generated, under the control of the reflected signals, which may be used to actuate indicators and to drive servo mechanisms for automatically maintaining the phase shifting condensers in adjustment for range tracking.

Various gating and sweep wave voltages are generated in the circuit incidentally to the above functions and are delivered to other circuits as required.

The synchronizer circuit of the present invention is especially adapted for use with the indicating device disclosed in my copending patent application Serial No. 506,167, filed October 14, 1943 which issued as Patent No. 2,512,703 on June 27, 1950.

Figure 2:
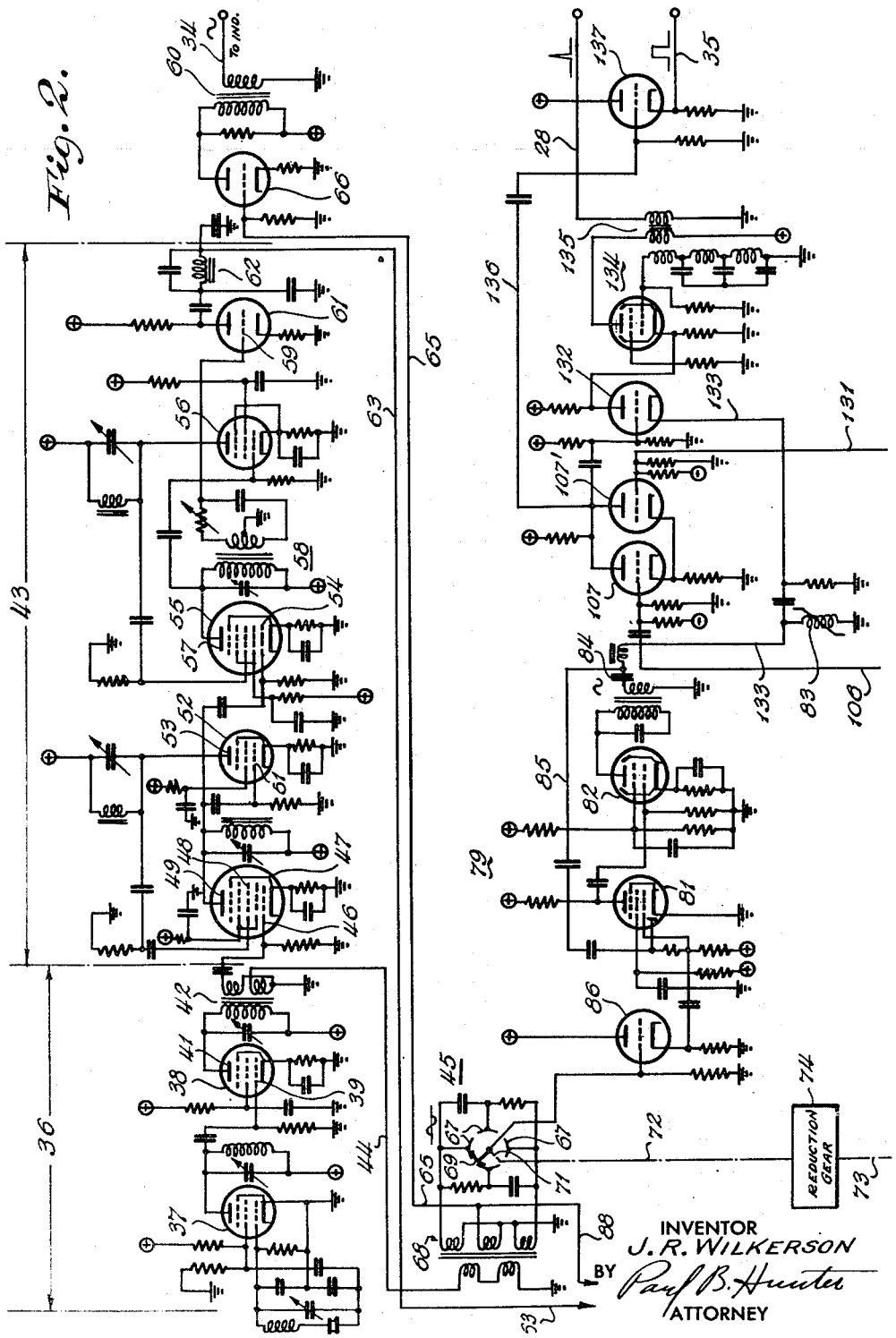
Figure 3:
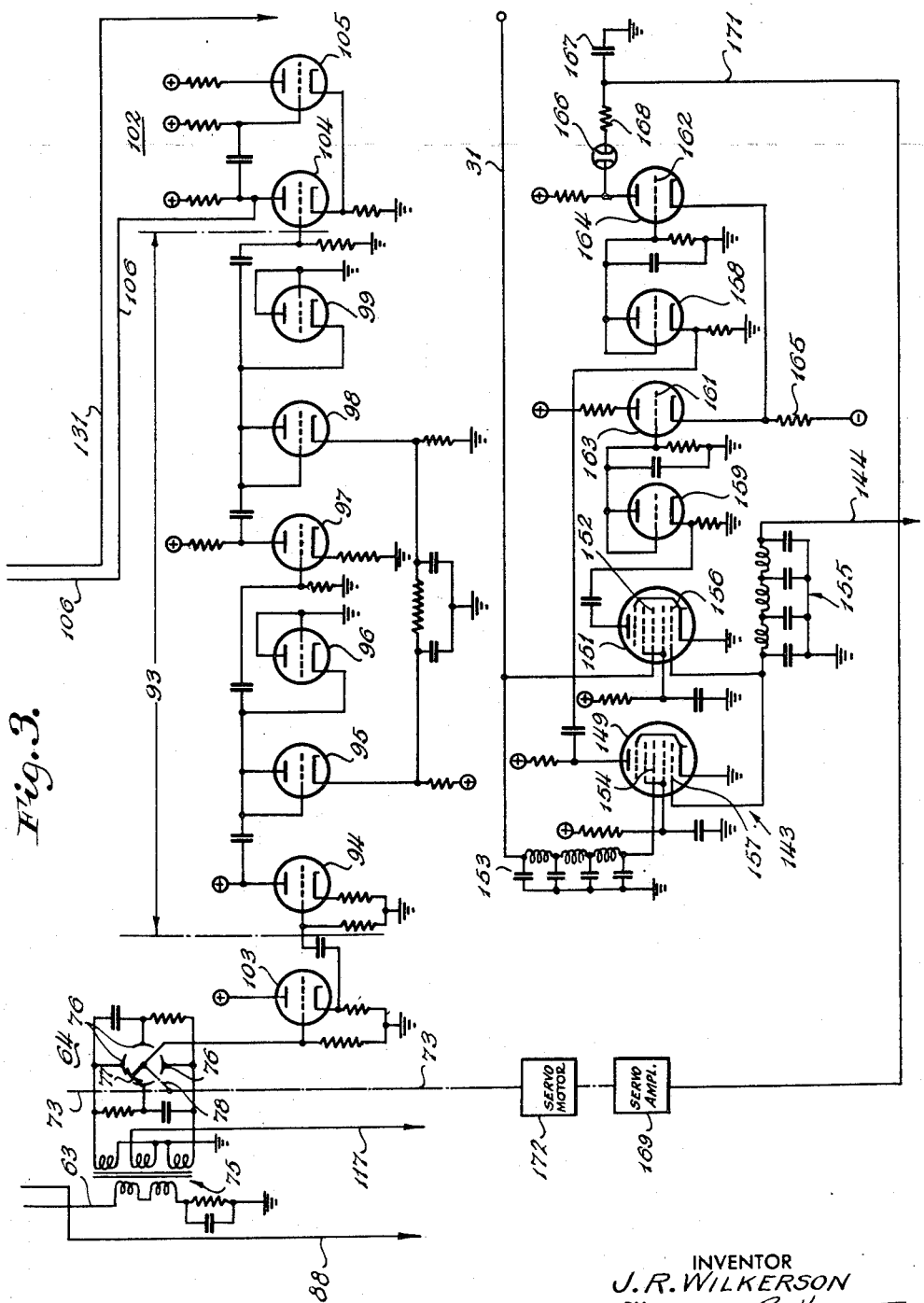
Figure 4:
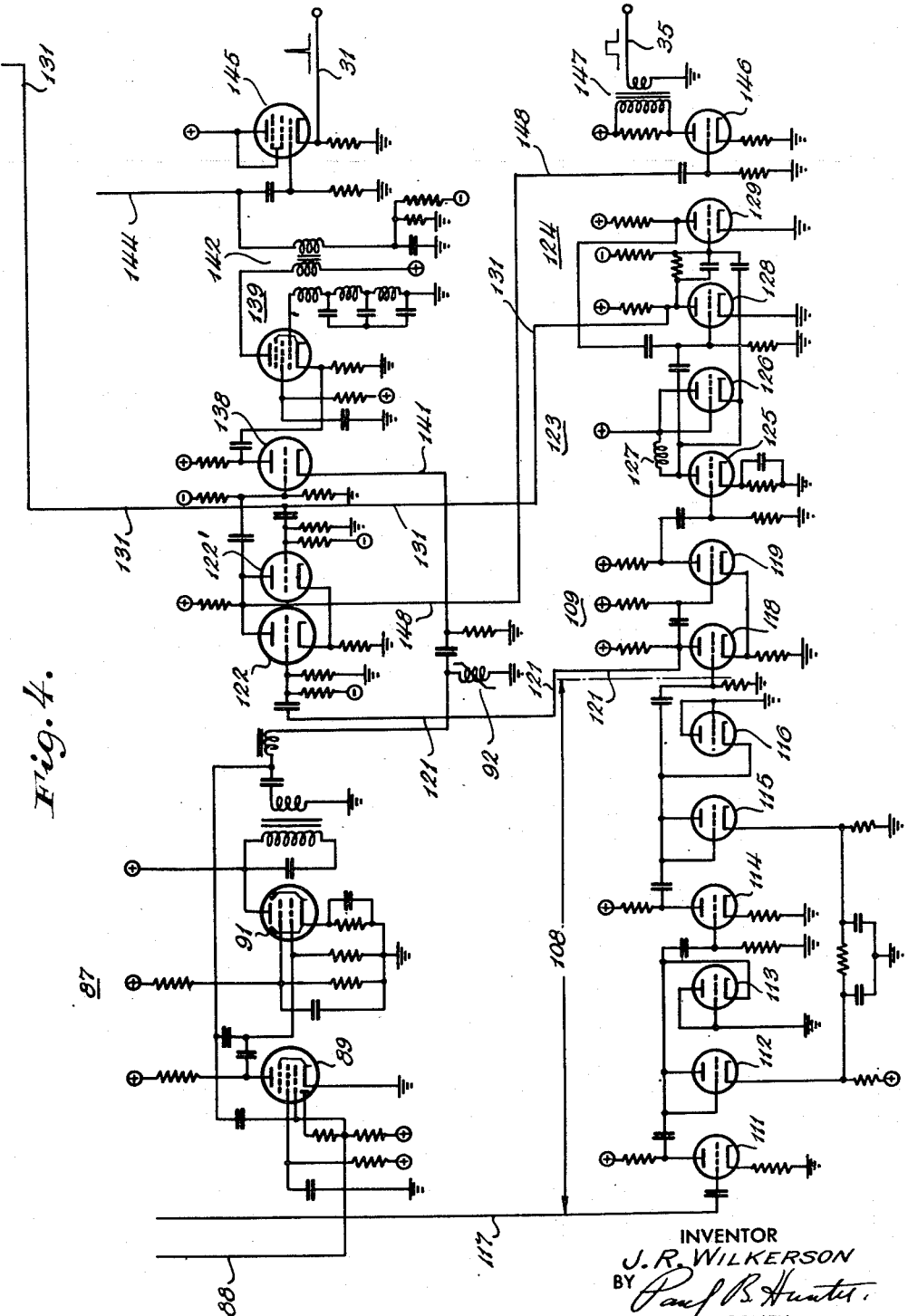

A more comprehensive understanding of my invention will be afforded from the following detailed description when considered with the accompanying drawings, in which like reference numerals have been used throughout to designate like parts and in which Fig. 1 is a block diagram of a radar system in which my improved synchronizing circuit may be employed, Figs. 2, 3, and 4 include a schematic diagram of the circuit embodying my invention, Fig. 5 is a time sequence diagram of the voltage wave forms generated within the circuit illustrated in Figs. 2, 3 and 4, for producing the required pulses, and Fig. 6 is a voltage wave form diagram illustrating the principles of operation of that portion of the circuit employed for automatic ranging.

While my invention is not limited to any one application it is adaptable to radar apparatus and its use in connection with such a system will be illustrated for the purpose of developing the requirements which it is designed to meet.

In this particular application definite values will be assigned to ranges, repetition rates, frequencies, pulse durations, etc., in order that the interrelation of each may be clearly shown. It is to be understood however that my invention is not limited to the values used nor are they to be construed as restricting its scope.

In the radar system illustrated in Fig. 1, the known speed of radio wave propagation is utilized to determine the range of a target 15 located in space. The area in which targets are likely to be found is scanned by radio waves in the following manner. A wave pattern, made by the rotation of a lobe 16 about an axis 18, is transmitted from a dipole antenna (not shown) which is rotated within a parabolic reflector 19 carried on mount 21. Mount 21 is supported for 360° rotation on trunnion 22 and parabolic reflector 19 is movable vertically so that elevation scanning is provided as well as azimuth scanning.

The radio waves forming the beam 16 are generated in transmitter 23 and conducted to the antenna for radiation by conductor 24. They are received by the same antenna as waves reflected from the target 15 and fed to a receiver 25, by conductors 24 and 26.

Transmission is initiated in transmitter 23 by a trigger pulse which is supplied from synchronizer 27 through line 28. A sweep wave gate is also supplied over line 29. A narrow gate is generated in the synchronizer 27 for delivery to receiver 25 over line 31 and the latter element supplies the former with video signals over line 32 which are used by the autoranging network of the synchronizer 27. Video signals are likewise transmitted to an indicator 33 over conductor 34'. A part of the fixed frequency voltage generated in synchronizer 27 is delivered to indicator 33 over conductor 34, which circuit also receives sweep gating voltage pulses from the same source by way of conductor 35.

The generation of the various voltages mentioned above in connection with the system is, as stated before, a function of synchronizer 27, which, as an embodiment of my invention, is illustrated in Figs. 2, 3, and 4.

In the above described radar system the maximum range may be taken as 50,000 yards, which on the basis of the known speed of radio waves and the desired use of a 2000 yard range increment, would dictate the use of a fixed frequency voltage of 81.94 kilocycles, one cycle thereof corresponding to a time delay of 12.2 micro-seconds, or 2000 yards of range.

Such a voltage is obtained from the fixed frequency generator 36 (Fig. 2), in which electronic discharge element 37 and its associated connections operates as a crystal oscillator with an output of 81.94 kilocycles. A similar element 38 which operates as a buffer, receives the output of oscillator 37 on its control grid 39 and serves to isolate the oscillator against changes in load and to improve the wave form of its output as taken from its plate 41.

The 81.94 kilocycle voltage from generator 36 is taken from the secondary winding of a transformer 42, whose primary winding is connected in the plate circuit of tube 38, for delivery to a frequency divider network 43 and over line 44 to a phase shifting condenser 45.

The ultimate function of frequency divider 43 is to decrease the repetition rate of the transmitter's output, which is accomplished by reducing the 81.94 kilocycle voltage through a series of divisions.

This voltage, received on grid 46 of element 47, is divided on a 5:1 ratio as follows. Element 47, illustrated as a pentagrid converter, is connected to modulate the 81.94 kilocycle input on grid 46 with a voltage having a frequency of 65.55 kilocycles (⅘ of 81.94) received on grid 48 to furnish a difference frequency of 16.39 kilocycles (⅕ of 81.94) on plate 49. This latter voltage of 16.39 kilocycles is then fed to grid 51 of element 52, which is connected to act as a harmonic generator, where it is multiplied by four to furnish at plate 53 the 65.55 kilocycle voltage required by modulator 47.

Thus a 16.39 kilocycle voltage is delivered to grid 54 of element 55, which together with element 56, is connected in identical manner to operate as a second 5:1 frequency divider to furnish a 3278 cycle voltage at plate 57. From this point it is delivered through a phase shifting bridge 58 to grid 59 of amplifier 61. The output of amplifier 61 is passed through filter 62 and thence over line 63 to a 3278 cycle phase shifting condenser 64 (Fig. 3).

The fixed frequency voltage (81.94 kilocycles) produced by generator 36 is taken from the phase shifting circuit 44 over line 65, to amplifier 66, from which point it is delivered through transformer 60 and over line 34 to indicator circuit 33 (Fig. 1).

It will be recalled that one cycle of the 81.94 kilocycle voltage corresponds to a time delay of 12.2 micro-seconds or a distance of 2000 yards insofar as the illustrated application is concerned. To provide for the measurement of these time delay increments it is proposed to shift the phase of the fixed frequency voltage in a manner which will eliminate ambiguity over a series of cyclical changes. Such is the function of the phase shifting condensers 45 (Fig. 2) and 64 (Fig. 3).

In the former the four stator plates 67 of the condenser are fed equal 81.94 kilocycle voltages from the secondary windings of transformer 68 with phase shifts of 0°, 90°, 180° and 270°. The rotor 69 is shaped to deliver a constant output voltage whose phase shift from the input corresponds to the angular position of shaft 71.

Since it is proposed to measure distance by utilizing the time delay between a pulse, or pip, generated from the unshifted 81.94 kilocycle voltage and a similar one generated from the 81.94 kilocycle voltage whose phase is shifted by condenser 45, it is necessary that the degree of shift be measurable. Accordingly, the condenser is so designed that one revolution of rotor 69 produces a phase rotation of 360° at 81.94 kilocycles, which is equivalent to a time delay of 12.2 microseconds, or 2000 yards range.

Obviously the phase shift produced by condenser 45 becomes ambiguous after one revolution, since one pip will be generated for each cycle of the 81.94 kilocycle voltage. If the circuit is to be adaptable to uses requiring measurements in excess of 12.2 micro-second time delay, for example in the 50,000 yard radar system herein described for illustrative purposes, this ambiguity must be removed.

For this purpose a second phase shifting condenser 64 (Fig. 3) is provided which is geared to condenser 45 by shafts 72 and 73 through a reduction gear 74. In keeping with the illustrative values previously established the ratio of reduction of gear 74 is 25:1 so that a 25° rotation of condenser 45 produces a 1° rotation of condenser 64.

Unlike condenser 45 which receives an 81.94 kilocycle voltage, condenser 64 is supplied with the 3278 cycle voltage from frequency divider 43 (Fig. 2). This voltage from line 63, is taken from the secondary windings of a transformer 75 and fed to stator plates 76 of condenser 64. Here the plates 76, the rotor 77, and shaft 78 are designed as are those of condenser 45.

Since the frequency of the voltage applied to condenser 64 is one-twenty-fifth of that applied to condenser 45, and since, through the action of reduction gear 74, the corresponding angular rotation of the former is one-twenty-fifth of the latter, a gating voltage pulse, or gate, derived from the 3278 cycle output of condenser 64 will be synchronized with the pips generated from the 81.94 kilocycle output of condenser 45 and may be used to select one of them. Thus ambiguity begins only after one complete revolution of condenser 64, equivalent to a time delay of approximately 305 micro-seconds, or in terms of range, 50,000 yards, while the degree of accuracy is determined by the finer adjustment of condenser 45.

As mentioned above, a pip is generated from the 81.94 kilocycle output of phase shifting condenser 45 and a gate from the 3278 cycle voltage output of condenser 64.

The pip is produced in a pulse generator 79 (Fig. 2) which includes a variable gain amplifier 81, a power amplifier 82 and a Peterson coil 83. This latter element generates positive and negative pips of approximately 1/8 micro-second duration which occur in time at the zero points on the 81.94 kilocycle sine wave. Feedback is provided over line 85 to furnish amplifier 81 with bias for automatic gain control. A voltage divider to positive source in the grid circuit of element 81 provides a delayed A. V. C. action. Since the output impedance of condenser 45 is relatively high, a cathode follower 86, which may take the form of a triode, is interposed between the condenser and the initial stage of pulse generator 79 to drive the latter.

An identical pulse generator 87 (Fig. 4) is provided to generate pips from the fixed phase voltage (81.94 kilocycles), which is taken from a secondary winding of transformer 68 (Fig. 2) by line 88. Within this branch (87) elements 89, 91 and 92 are connected to operate as do like elements 81, 82, and 83 in generator 79.

Just as pips are generated from the shifted and unshifted 81.94 kilocycle voltages, so are gates generated from the 3278 cycle voltages, both shifted and unshifted.

Within a wave squaring circuit 93 (Fig. 3), comprising elements 94, 95, 96, 97, 98 and 99, the shifted 3278 cycle sinusoidal voltage is squared for delivery to a cathode-coupled multivibrator 102 where it is converted into a 12.2 micro-second gate which is synchronized with the shifted 3278 cycles. A cathode follower 103 is interposed between condenser 64 and wave squarer 93 as an impedance matching device. Cathode-coupled multivibrator 102, which includes electronic discharge devices 104 and 105, delivers this 12.2 micro-second gating pulse from the plate circuit of its final stage 104 over line 106 to a gating circuit 107 (Fig. 2).

An identical gate generator comprising a wave squaring circuit 108 (Fig. 4) and a cathode-coupled multivibrator 109, produces a 12.2 micro-second gate from, and in synchronization with, the unshifted 3278 cycle voltage. Wave squaring circuit 108 made up of elements illustrated as triodes 111, 112, 113, 114, 115 and 116, receives on the grid of its initial stage, by way of conductor 117, the unshifted 3278 cycle voltage from transformer 75 associated with phase shifting condenser 64 (Fig. 3). The output of multivibrator 109 is taken from its final two stages 118 and 119, over line 121 for delivery to a gating element 122.

Recalling the requirements of the illustrative application, a maximum range of 50,000 yards was desired for the radar system. With this range as a basis, a triggering pulse voltage of 81.94 kilocycles was chosen, the period (12.2 micro-seconds) of one cycle thereof being equivalent in range to a distance of 2000 yards. To prevent ambiguity in the phase shifting circuits and to reduce the repetition rate of the trigger pulse, a reduction of frequency was made to produce a voltage of 3278 cycles, equivalent to one-twenty-fifth of the 81.94 kilocycles. Gating voltages, in the circuits just described, were then generated from the 3278 cycles through which the 81.94 kilocycle pips could be passed to reduce their repetition rate.

It is possible in some applications, and the same is true in the illustrative example, that the repetition rate of the transmitted pulse need be reduced further than that required to give a sufficient time delay, or extended range, without ambiguity.

Such a reduction therefore requires a decrease in the repetition rate of the gating pulse independently of the 3278 cycle voltage. This reduction is accomplished by a pip generator 123 (Fig. 4), a multivibrator 124 and the gating elements 107' (Fig. 2) and 122' (Fig. 4).

Pip generator 123, comprising elements 125 and 126, generates a pip at the tail of each fixed 12.2 micro-second pulse generated in 109 and received on the grid of tube 125 which is made to conduct for the duration of this pulse or gate. At the end of the gate, tube 125 is cut off and a damped sine wave is set up in inductance coil 127 and its distributed capacitance. After the first half cycle, unilateral current conducting element 126 becomes conducting and dissipates the rest of the energy of the wave train set up in inductance coil 127. Multivibrator 124 is so designed that element 128 thereof is conducting for one cycle out of three at 3278 cycles. The output of discharge device 128 is therefore negative for one cycle out of three and is used as a gating pulse for valves 107' (Fig. 2) and 122', being delivered to them over conductor 131. This gate renders these valves non-conducting for one cycle out of three thereby passing only one gate out of three passed respectively by gating elements 107 and 122. It is to be noted that the gating pulse applied to elements 107' and 122' "opens" and "closes" at the ends of the 12.2 micro-second fixed phase gates. It will therefore open at the end of one fixed 12.2 micro-second gate; pass the next succeeding variable phase 12.2 micro-second gate and the next fixed phase 12.2 micro-second gate; and will then close.

Electronic valve 132 (Fig. 2) is rendered conducting by the 12.2 micro-second gate received from element 107 for only one cycle out of three (at 3278 cycles), since valve 107 passes only one such gate out of three. Consequently, valve 132 passes only one out of every seventy-five ⅛ micro-second pips generated in pulse generator 79 and received therefrom over line 133. The pips, thus passed, trigger a blocking oscillator 134 which in turn produces a transmitter trigger pulse having a repetition rate of 1093 cycles, equal to that of the pips passed, or one-third of 3278 cycles. These transmitter pulses are taken from blocking oscillator 134, through transformer 135 and delivered over line 28 (Fig. 1) to transmitter 23, to perform one of the primary functions of the circuit.

The variable phase 12.2 micro-second gate is taken from the plate circuit of element 107 by conductor 136 and fed to a repeater tube 137 where it is repeated for delivery to indicator 33 (Fig. 1) over line 35.

A 2 micro-second gate, used by receiver 25 of the radar system illustrated in Fig. 1, is employed to limit the target area of that device. Since it must have a repetition rate equal to that of the transmitted pulse, it is produced in a manner similar to that of the transmitter trigger pulse, by electronic switching device 138 (Fig. 4) and blocking oscillator 139.

Here in a manner identical with that describing the generation of the transmitter trigger pulse, a 2 micro-second gate is produced having a repetition rate of 1093 cycles. Thus, the gate taken from multivibrator 124 over conductor 131 is fed to the grid of element 122', which turns it on to pass only one out of three of the 12.2 micro-second gates derived from the unshifted 3278 cycle voltage in multivibrator 109 and received on the grid of valve 122. Accordingly, the 12.2 micro-second gate, now having a repetition rate of 1093 cycles, controls valve 138 to pass, at this repetition rate, the pips generated in network 87 from the unshifted 81.94 kilocycle voltage. These pips, taken from generator 87 by line 141, are passed by valve 138 at a repetition rate of 1093 cycles and trigger the blocking oscillator 139 which generates the desired 2 microsecond gate. This gate is passed through pulse transformer 142 from whose secondary winding it is delivered to autoranging network 143 (Fig. 3) and to the receiver 25 (Fig. 1). Conductor 144 serves network 143, and receiver 25 is supplied through a repeating tube 145 and over line 31.

A repeater tube 146 and pulse transformer 147 are used to repeat the fixed phase 12.2 micro-second gate into indicator 33 (Fig. 1) over line 35. This gate is taken from the plate of element 122 by line 148 for application to the grid of repeater 146.

In connection with its application to the radar system illustrated in Fig. 1, one of the functions of the synchronizer is to condition that device for automatic range tracking. This result is accomplished in that branch of the synchronizer circuit illustrated in Fig. 3 and designated by the numeral 143. Here two mixing elements illustrated as pentagrid converters 149 and 151, are utilized as coincidence tubes. Video signals are received from receiver 25 (Fig. 1) over line 31. They are applied directly to control grid 152 of mixer 151 and through a 2 micro-second delay line 153 to grid 154 of element 149. The 2 microsecond gate received from blocking oscillator 139 (Fig. 4) over line 144 is delayed in a delay line 155 before it is applied to grids 156 and 157 of tubes 151 and 149, respectively. The outputs of mixers 149 and 151 are taken from their respective plate circuits and fed to the cathodes of triodes 158 and 159, respectively, which are connected to operate as unilateral current conducting devices. The outputs of rectifiers 159 and 158 are delivered respectively to the grids 161 and 162 of elements 163 and 164 whose cathodes are connected across a common cathode resistor 165. The output from the plate of tube 164 is used to ignite the gaseous element 166 and condenser 167 is charged through it and resistor 168. The voltage across condenser 167 is then fed to servo-amplifier 169 over conductor 171 where it is amplified for driving servo motor 172, to condition the range condensers 64 and 45 (Fig. 2). Through circuit 143 these phase shifting condensers are adjusted for autoranging in accordance with the signals received over line 31 as will be explained in connection with the description of the entire circuit's operation which follows.

Since a majority of the synchronizer's components are conventional circuits and therefore require no detailed explanation of their operation and since all pertinent operational details have appropriately been stated as the element concerned was described, only a general recital of the circuit's over-all operation will be made. This will be presented with reference to Figs. 5 and 6 which depict the wave forms of the various voltages produced in the synchronizer circuit.

The fixed frequency voltage represented by sine wave 1 in Fig. 5 is generated in generator 36 (Fig. 2). Sine wave 1, whose phase remains fixed, is transmitted over line 44, through transformer 68 and over line 88 to pip generator 87 (Fig. 4), where a positive pip, illustrated as pip 1, is generated for each cycle of the fixed frequency voltage to occur in point of time when this voltage passes from positive to negative through its zero point such as 173. Sine wave 1 is shifted in phase in condenser 45 to yield sine wave 2.

A similar pip, pip 2, is generated from each cycle of sine wave 2, whose phase is shifted, to occur at its zero point 174. This pip is developed in generator 79 (Fig. 2), the fixed frequency voltage being taken from transformer 68 through phase shifting condenser 45.

A third sinusoidally varying voltage, shown as sine 3, is produced by passing a portion of the voltage generated at 36 through the frequency divider 43. This voltage, taken from the divider by line 63, is delivered to transformer 75 (Fig. 3) where a portion of it (unshifted) is routed over line 117 to wave squaring circuit 108 (Fig. 4) and a portion to phase shifting condenser 64 where a fourth sine wave, sine 4, is produced.

By means of the wave squaring circuit 108 (Fig. 4) and multivibrator 109, a gate 175, gate 3, is developed from sine 3 which is synchronized to occur in point of time at its zero point 176, with one zero point, such as 173, of the voltage, sine 1, and with a pip, such as 177, generated from sine 1.

Similarly, by means of wave squaring circuit 83 (Fig. 3) and multivibrator 102, a gate 178

(gate 4, Fig. 5) is generated from sine 4, whose phase has been shifted at condenser 64, to occur at zero point 174 and with pip 181 derived therefrom.

To effect a further reduction in repetition rate, a gating voltage is produced by pip generator 123 (Fig. 4) and multivibrator 124 which is used by elements 122 and 122' and 107 (Fig. 2) and 107' to pass only a selected number of gates such as 175 and 178, respectively. These gates in turn, through the action of elements 138 and 132, pass only a selected number of pips, such as 177 and 181 of pip 1 and pip 2, equal to the repetition rate of the selected gates 175 and 178.

By this gating process pips such as 182, are produced from sine 1 whose repetition rate is reduced from the frequency thereof to one which includes the decrease in frequency divider 43 and that produced by the gating elements 122, 122' and 138.

Similar pips, such as 183, having the same repetition rate, are generated from the phase shifted voltage.

These pips, 182 and 183, are used to trigger blocking oscillators 139 and 134, respectively. Blocking oscillator 134 (Fig. 2) triggers a transmitter to produce a transmitter pulse 184, and oscillator 139 (Fig. 4) generates the narrow gate 185.

Thus, in the radar system illustrated in Fig. 1, the transmitter 23 is triggered to produce transmitter pulse 184, which has a repetition rate of 1093 cycles and whose phase may be advanced or retarded as indicated by the double arrow. These transmitted pulses are then received as reflected signals from the target by receiver 25. By suitable indicating means provided in indicator 33 it is possible to adjust the phase shifting condensers 45 (Fig. 2) and 64 (Fig. 3) until the reflected signal 184 is received by receiver 25 in coincidence with the gate 185 from synchronizer 27, whose phase is fixed. Since phase shifting condenser 45 is so designed that one revolution of its rotor is equivalent to a time delay of 12.2 micro-seconds (a shift of one cycle of the 81.94 kilocycle voltage, or 2000 yards range) and since the number of degrees of phase shift necessary to bring signals 184 and 185 into coincidence is a measure of the time required for signal 184 to go out to target 15 and back to the detector, the angular displacement of rotor 69 in phase shifter 45 is, on a basis of speed of radio wave propagation, a measure of range.

At this juncture, it should be recalled that the channels for producing the transmitter trigger pulse and the receiver gate are identical with the exception of the phase shifting condensers. Thus, any change in voltage, temperature or the like, which effects a change of phase in one channel will produce a compensating phase shift in the other channel, and the errors produced by such changes are accordingly eliminated. This increases the accuracy of the system's ranging apparatus and constitutes one of the princpal advantages of my improved synchronizer circuit.

Now, obviously if the target is moving away from or toward the detector the transit time of signal 184 will be changing continuously and it will be necessary to change the setting of phase shifting condensers 45 and 64 to compensate for this change in range.

This adjustment of the system's range sensing mechanism is called range tracking and may be accomplished manually or automatically.

Automatic range tracking is a function of the synchronizer and is accomplished by the autoranging circuit 143 (Fig. 3) whose operation will be explained with the aid of Fig. 6.

Here the narrow gate 185, enlarged for purposes of illustration, is shown in relationship with reflected signal 184.

In circuit 143 video signal 184 from receiver 25 is delayed in delay line 153 to produce delayed signal 186. Similarly narrow gate 185 is delayed in delay line 155 to produce delayed gate 187. Within the mixers 149 and 151 which act as coincidence tubes, delayed signal 186 and undelayed signal 184 are respectively mixed with delayed gate 187.

If range synchronism is perfect, gate 187 will fall exactly between signals 184 and 186, as shown, and coincidence signal curves 1 and 2 will be produced as the outputs of mixers 151 and 149, respectively. For this condition coincidence signals such as 188 and 189 will be developed whose magnitudes are equal.

Now as the target moves, signals 184 and 186 will be advanced or retarded with respect to fixed gate 187 and coincidence signals such as 191 and 192 will obtain. Within the remaining part of the circuit a voltage is developed across condenser 167 whose rate of change is proportional to the potential difference of signals 191 and 192. This voltage as amplified in servo amplifier 169 is used to drive servomotor 172 which in turn positions phase shifting condensers 64 (Fig. 3) and 45 (Fig. 2) to advance or retard signals 184 and 186 until they again bracket signal 187, thereby bringing the system into range synchronism.

Since the range rate of servomotor 172 is proportional to servo amplifier input, or the voltage developed across condenser 167, the servo range rate will thus be corrected toward the proper value. Direction will be provided by the polarity of the amplifier input about a reference.

Should the radar signal fade out, the output of amplifier 164 will fall to approximately zero, the charge on condenser 167 will remain constant and the range rate previously established will be maintained.

Modifications of my invention are of course possible and may present themselves in view of the foregoing disclosure. Accordingly the descriptions and representations herein made are to be considered illustrative and nowise in a restricted sense and the spirit and scope of my invention to be regarded as of such breadth as is defined by the appended claims.

What is claimed is:

1. In combination, a first source of fixed-frequency voltage, first adjustable phase-shifting means connected to said first source and adapted to supply a second voltage identical in frequency but displaced in phase relative to said fixed-frequency voltage, separate means for generating first and second series of pulses each having a periodicity equal to the frequency of said fixed-frequency voltage and having a given phase relationship respectively to said fixed-frequency voltage and to said second voltage, a source of a third voltage having a frequency which is a submultiple of that of said fixed-frequency voltage, second adjustable phase-shifting means connected to said third-voltage source and adapted to supply a fourth voltage identical in frequency but displaced in phase relative to said third voltage, separate means for generating third and fourth series of pulses each having a periodicity equal to the frequency of said third voltage and having a given phase relationship respectively to said third and fourth voltages, means for controlling the transmission of said first and second series of pulses respectively by said third and fourth series of pulses, means for subjecting said controlled second series of pulses to an unknown time delay, and means for indicating time coincidence between said controlled first series of pulses and said delayed controlled second series of pulses, whereby the settings of said first and second phase-shifting means provide a measure of said unknown time delay.

2. In combination, a first source of fixed-frequency voltage, first adjustable phase-shifting means connected to said first source and adapted to supply a second voltage identical in frequency but displaced in phase relative to said fixed-frequency voltage, separate means for generating first and second series of pulses each having a periodicity equal to the frequency of said fixed-frequency voltage and having a given phase relationship respectively to said fixed-frequency voltage and to said second voltage, a source of a third voltage having a frequency which is a submultiple of that of said fixed-frequency voltage, second adjustable phase-shifting means connected to said third-voltage source and adapted to supply a fourth voltage identical in frequency but displaced in phase relative to said third voltage, separate means for generating third and fourth series of pulses each having a periodicity equal to the frequency of said third voltage and having a given phase relationship respectively to said third and fourth voltages, means for generating a fifth series of pulses having a periodicity which is a submultiple of that of said fourth series of pulses, means for controlling the transmission of said first and second series of pulses respectively by said third and fifth series of pulses, means for subjecting said controlled second series of pulses to an unknown time delay, and means for indicating time coincidence between said controlled first series of pulses and said delayed controlled second series of pulses, whereby the settings of said first and second phase-shifting means provide a measure of said unknown time delay.

3. In combination, a source of fixed-frequency voltage, adjustable phase-shifting means connected to said source and adapted to supply a voltage identical in frequency but displaced in phase relative to said fixed-frequency voltage, separate means for generating first and second series of pulses each having a periodicity equal to the frequency of said fixed-frequency voltage and having a given phase relationship respectively to said fixed-frequency voltage and to said phase-shifted voltage, means for subjecting said second series of pulses to a variable time delay, and means actuated by the time displacement between said first series of pulses and said delayed second series of pulses for automatically varying the setting of said phase-shifting means to provide a continuous measure of said variable time delay.

4. In combination, a first source of fixed-frequency voltage, first adjustable phase-shifting means connected to said first source and adapted to supply a second voltage identical in frequency but displaced in phase relative to said fixed-frequency voltage, separate means for generating first and second series of pulses each having a periodicity equal to the frequency of said fixed-frequency voltage and having a given phase relationship respectively to said fixed-frequency voltage and to said second voltage, a source of a third voltage having a frequency which is a submultiple of that of said fixed-frequency voltage, second adjustable phase-shifting means connected to said third-voltage source and adapted to supply a fourth voltage identical in frequency but displaced in phase relative to said third voltage, separate means for generating third and fourth series of pulses each having a periodicity equal to the frequency of said third voltage and having a given phase relationship respectively to said third and fourth voltages, means for generating a fifth series of pulses having a periodicity which is a submultiple of that of said fourth series of pulses, means for controlling the transmission of said first and second series of pulses respectively by said third and fifth series of pulses, means for subjecting said controlled second series of pulses to a variable time delay, and means actuated by the time displacement between said controlled first series of pulses and said delayed controlled second series of pulses for automatically varying the setting of said phase-shifting means to provide a continuous measure of said variable time delay.

5. In combination, a source of fixed-frequency voltage, adjustable phase-shifting means connected to said source and adapted to supply a voltage identical in frequency but displaced in phase relative to said fixed-frequency voltage, separate means for generating first and second series of pulses each having a periodicity equal to the frequency of said fixed-frequency voltage and having a given phase relationship respectively to said fixed-frequency voltage and to said phase-shifted voltage, means for subjecting said second series of pulses to an unknown time delay, and a servo motor responsive to phase variations between said first series of pulses and said delayed second series of pulses for activating said adjustable phase-shifting means, thereby providing an indication of said unknown time delay.

JEFFERSON R. WILKERSON.

REFERENCES CITED

The following references are of record in the file of this patent:

UNITED STATES PATENTS

| Number | Name | Date |
|---|---|---|
| 1,924,174 | Wolf | Aug. 29, 1933 |
| 2,209,064 | Nyquist | July 23, 1940 |
| 2,403,527 | Hershberger | July 9, 1946 |
| 2,403,975 | Graham | July 16, 1946 |
| 2,405,239 | Seeley | Aug. 6, 1946 |
| 2,406,316 | Blumlein | Aug. 27, 1946 |
| 2,415,095 | Varian | Feb. 4, 1947 |